US008799120B2

(12) United States Patent
Malka et al.

(10) Patent No.: US 8,799,120 B2
(45) Date of Patent: Aug. 5, 2014

(54) SYSTEMS AND METHODS FOR MANAGING A FINANCIAL INVESTMENT FUND

(75) Inventors: Benjamin H. Malka, Boston, MA (US); Brian Jonas Hirschfeld, Boston, MA (US)

(73) Assignee: Capital One Financial Corporation, Falls Church, VA (US)

(*) Notice: Subject to any disclaimer, the term of this patent is extended or adjusted under 35 U.S.C. 154(b) by 2343 days.

(21) Appl. No.: 10/712,353

(22) Filed: Nov. 14, 2003

(65) Prior Publication Data

US 2005/0108120 A1    May 19, 2005

(51) Int. Cl.
*G06Q 40/00* (2012.01)
*G06Q 40/02* (2012.01)

(52) U.S. Cl.
USPC ........................................... 705/35; 705/36 R

(58) Field of Classification Search
USPC ...................... 705/1, 35, 36, 36 R
See application file for complete search history.

(56) References Cited

U.S. PATENT DOCUMENTS

| | | | | |
|---|---|---|---|---|
| 4,774,663 | A | * | 9/1988 | Musmanno et al. ......... 705/36 R |
| 4,985,833 | A | | 1/1991 | Oncken ......................... 364/408 |
| 5,291,398 | A | * | 3/1994 | Hagan ................................. 705/4 |
| 5,297,026 | A | * | 3/1994 | Hoffman ......................... 705/14 |
| 5,987,436 | A | * | 11/1999 | Halbrook .................... 705/36 R |
| 5,991,744 | A | * | 11/1999 | DiCresce .................... 705/36 R |
| 6,085,174 | A | * | 7/2000 | Edelman .................... 705/36 R |
| 6,336,102 | B1 | * | 1/2002 | Luskin et al. .................. 705/35 |
| 7,509,286 | B1 | * | 3/2009 | Bent et al. ....................... 705/39 |
| 7,519,551 | B2 | * | 4/2009 | Bent et al. ....................... 705/35 |
| 2002/0013751 | A1 | * | 1/2002 | Facciani et al. ................ 705/36 |
| 2003/0028465 | A1 | * | 2/2003 | Kosinski ......................... 705/36 |
| 2003/0083972 | A1 | * | 5/2003 | Williams ......................... 705/36 |
| 2003/0204460 | A1 | * | 10/2003 | Robinson et al. .............. 705/35 |

OTHER PUBLICATIONS

Carll, Joseph M.; "Should insurance agents be offering CDs?"; Best's Review (Life/Health) v96, n10; Feb. 1996; pp. 1-4.*
PR Newswire; "ICBA: Index Powered CD New Preferred Service Provider"; Thursday, Feb. 27, 2003; pp. 1-2.*
PR Newswire; "Great Western to Close Phoenix Branch; Commitment Remains Strong to Home Lending Operation"; Feb. 9, 1993; pp. 1-2.*
Leung, James; "Are you being served?"; Oct. 1999; pp. 1-4.*
Dueker, Michael J.; "Indicators of monetary policy: The view from implicit feedback rules"; Sep./Oct. 1993; pp. 1-13.*
Lee C. Eisinberg; Money Talks; "Be Aware of Different Types of Investment Risk"; Mar. 2001; pp. 33 and 35.*

(Continued)

*Primary Examiner* — Ella Colbert
(74) *Attorney, Agent, or Firm* — Finnegan, Henderson, Farabow, Garrett & Dunner, L.L.P.

(57) ABSTRACT

Providing a financial investment fund includes receiving a plurality of individual-funds corresponding to a plurality of investors respectively and aggregating the plurality of individual funds into an aggregated fund. Next, providing a financial investment fund includes purchasing a plurality of financial instruments from at least one financial institution with a first portion of the aggregated fund and placing a second portion of the aggregated fund in a transaction account. The financial investment fund may include at least the financial instruments and the transaction account. In addition, one of the at least one financial institution may use at least a portion of the first portion of the aggregated fund received in exchange for the plurality of financial instruments to perform a function of the financial institution.

36 Claims, 4 Drawing Sheets

(56) References Cited

OTHER PUBLICATIONS

Jeff D. Opdyke and Ruth Simon; "Getting Ready for a Double Dip—How to Prepare for Chance of a Renewed Recession; Don't Avoid the marker"; The Wall Street Journal; Jan. 28, 2003; pp. 1-4.*

George Hohmann; "Shopping for CD rate bargains; Lenders offer different strategies for investors"; Jan. 8, 2003; pp. 1-2.*

Robert D. Hershey Jr., "The Indexing Giant Nobody Knows," The New York Times, section 3, Apr. 25, 1999.

* cited by examiner

SYSTEMS AND METHODS FOR MANAGING A FINANCIAL INVESTMENT FUND

TECHNICAL FIELD

The present invention relates to the field of financial investment funds. More particularly, the present invention, in various specific embodiments, involves systems and methods for managing financial investment funds for a plurality of investors.

BACKGROUND INFORMATION

Financial institutions, such as banks, are critical to our global economy. A bank's primary function is to put their depositor's money to use by lending it out to others who can then use it to, for example, buy homes, businesses, or send their children to school. When a depositor places money in a bank, the money goes into a large pool along with other depositors' money, and the depositor's account is credited with the amount deposited. When the depositor writes checks or makes withdrawals, that amount is deducted from the account balance. The depositor earns interest on the balance of the account.

In the United States, the amount of money that a bank can lend is directly affected by the reserve requirement set by the Federal Reserve, which currently requires banks to hold 3 to 10 percent of the bank's total deposits in reserve. This amount can be held either in cash at the bank or in the bank's reserve account with the Federal Reserve Bank. Even though a law, such as the Federal Reserve Act, may require banks to keep a certain percentage of their money in reserve, if all depositors came to withdraw their money at the same time, there would not be enough. Consequently, if a bank fails, the depositor's money may be protected up to a certain limit as long as the bank is insured by, for example, the Federal Deposit Insurance Corporation (FDIC).

In performing their function, banks and other financial institutions provide a variety of financial services. Banks, for example, provide loans, issue certificates of deposit (CDs), provide credit card accounts, as well as other financial products. In particular, CDs bear a maturity date, a specified interest rate, and can be issued in various denominations. Technically, a CD is a promissory note made by a bank. CDs under $100,000 are called "small CDs" and CDs for more than $100,000 are called "large CDs" or "Jumbo CDs." Almost all large CDs, as well as some small CDs, are negotiable. Because the money held in a CD is expected to stay on deposit until maturity, a bank may assess a penalty if the money is withdrawn early. Typically, the penalty is three to six month's interest. In addition to other deposits, CDs up to $100,000 may be governmentally insured by the FDIC, for example. While insured deposits may be desirable, many depositors may find a CD's early withdraw penalty problematic.

As stated above, other services provided by financial institutions may include providing credit card services. Generally, a credit card provider pays a merchant for goods or services when the goods or services are provided to the credit card user. The credit card user, however, does not pay the credit card provider for some time after the goods or services are provided. Having enough money to pay merchants prior to receiving payment from the credit card user may be problematic for financial institutions providing credit card services.

Thus, there is a need for improved systems and methods for managing an investment fund that allows a financial institution to raise money to paying debts. For instance, there is a need for such improved systems and methods allowing a credit card issuer to raise money for paying merchants. Furthermore, there is a need for such improved systems and methods to be based on CDs.

SUMMARY OF THE INVENTION

In accordance with the current invention, a financial investment fund method and system are provided that avoid the problems associated with prior financial investment fund methods and systems as discussed herein above.

In one aspect, a method for providing a financial investment fund comprises receiving a plurality of individual funds corresponding to a plurality of investors respectively, aggregating the plurality of individual funds into an aggregated fund, purchasing a plurality of financial instruments from at least one financial institution with a first portion of the aggregated fund wherein one of the at least one financial institution uses at least a portion of the first portion of the aggregated fund received in exchange for the plurality of financial instruments to perform a function of the financial institution, and placing a second portion of the aggregated fund in a transaction account, the financial investment fund comprising at least the financial instruments and the transaction account.

In another aspect, a method for providing a financial investment fund comprises receiving a plurality of individual funds corresponding to a plurality of investors respectively, the plurality investors not being limited to a group comprising at least one of employees, contractors, and agents of an enterprise managing the financial investment fund, aggregating the plurality of individual funds into an aggregated fund, purchasing a plurality of financial instruments from at least one financial institution with a first portion of the aggregated fund, and placing a second portion of the aggregated fund in a transaction account, the financial investment fund comprising at least the financial instruments and the transaction account.

In yet another aspect, a system for providing a financial investment fund comprises a component for receiving a plurality of individual funds corresponding to a plurality of investors respectively, a component for aggregating the plurality of individual funds into an aggregated fund, a component for purchasing a plurality of financial instruments from at least one financial institution with a first portion of the aggregated fund wherein one of the at least one financial institution uses at least a portion of the first portion of the aggregated fund received in exchange for the plurality of financial instruments to perform a function of the financial institution, and a component for placing a second portion of the aggregated fund in a transaction account, the financial investment fund comprising at least the financial instruments and the transaction account.

In yet another aspect, a system for providing a financial investment fund comprises a component for receiving a plurality of individual funds corresponding to a plurality of investors respectively, the plurality investors not being limited to a group comprising at least one of employees, contractors, and agents of an enterprise managing the financial investment fund, a component for aggregating the plurality of individual funds into an aggregated fund, a component for purchasing a plurality of financial instruments from at least one financial institution with a first portion of the aggregated fund, and a component for placing a second portion of the aggregated fund in a transaction account, the financial investment fund comprising at least the financial instruments and the transaction account.

In yet another aspect, a computer-readable medium on which is stored a set of instructions for providing a financial investment fund, which when executed perform stages comprising receiving a plurality of individual funds corresponding to a plurality of investors respectively, aggregating the plurality of individual funds into an aggregated fund, purchasing a plurality of financial instruments from at least one financial institution with a first portion of the aggregated fund wherein one of the at least one financial institution uses at least a portion of the first portion of the aggregated fund received in exchange for the plurality of financial instruments to perform a function of the financial institution, and placing a second portion of the aggregated fund in a transaction account, the financial investment fund comprising at least the financial instruments and the transaction account.

In yet another aspect, a computer-readable medium on which is stored a set of instructions for providing a financial investment fund, which when executed perform stages comprising receiving a plurality of individual funds corresponding to a plurality of investors respectively, the plurality investors not being limited to a group comprising at least one of employees, contractors, and agents of an enterprise managing the financial investment fund, aggregating the plurality of individual funds into an aggregated fund, purchasing a plurality of financial instruments from at least one financial institution with a first portion of the aggregated fund, and placing a second portion of the aggregated fund in a transaction account, the financial investment fund comprising at least the financial instruments and the transaction account.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
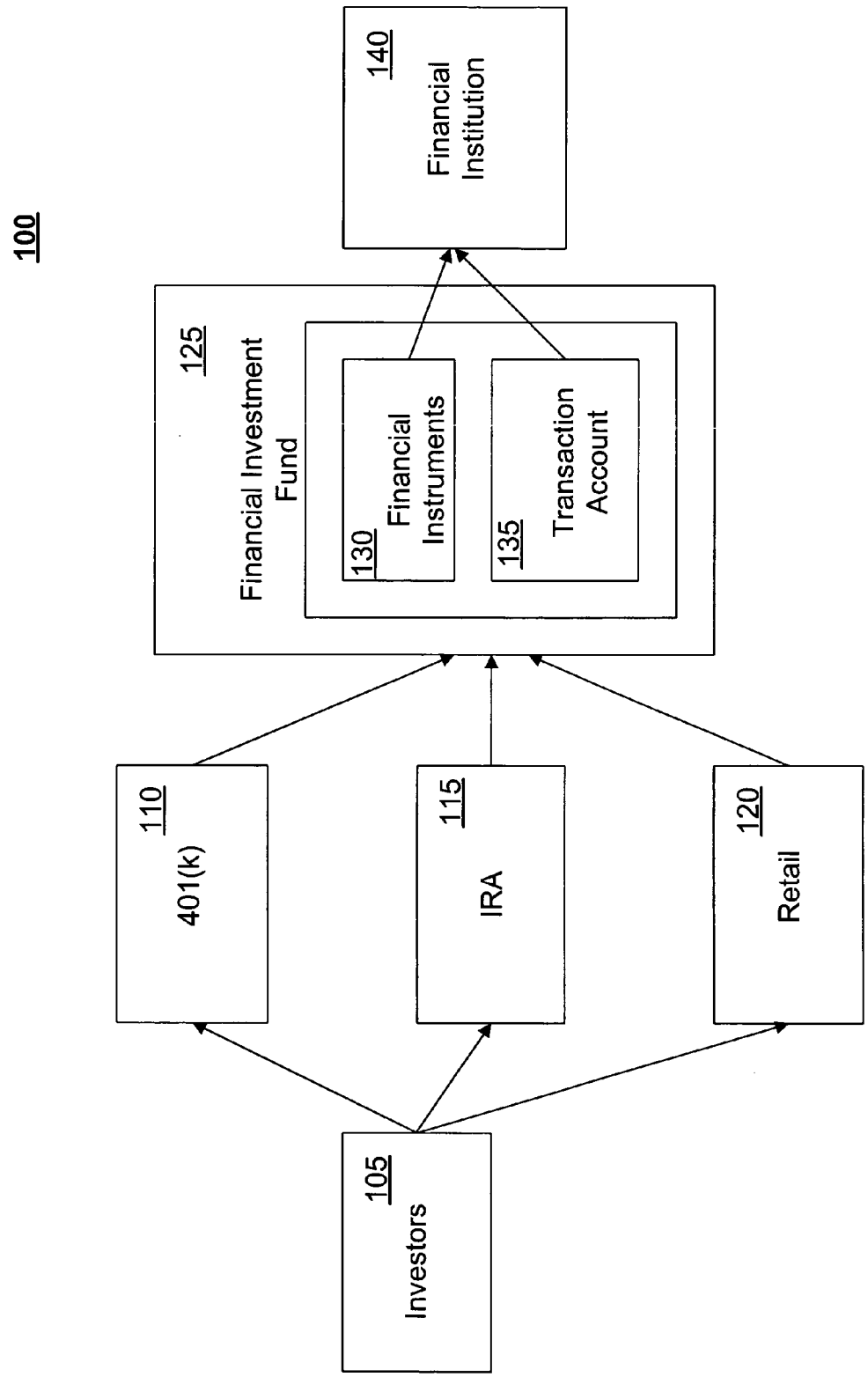
FIG. 1 is an illustration of an exemplary system for providing a financial investment fund consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

FIG. 1 illustrates a system for providing a financial investment fund 100 consistent an embodiment with the present invention. As shown in FIG. 1, investors 105 may invest funds in accounts comprising, for example, a 401 (k) program-account 110, an individual retirement account (IRA) 115, or through a retail account 120 provided through an investment house, for example. These accounts are exemplary, and other investment account may be employed. Once in the account, the investor's funds may be used to invest in a financial investment fund 125. Funds invested in financial investment fund 125 may be allocated at least between financial instruments 130 and a transaction account 135, as described in greater detail below. Financial instruments 130 may be purchased from a financial institution 140 or any other financial institution or institutions. Similarly, transaction account 135 may be maintained with financial institution 140 or any financial institution that provides account services.

Figure 2:
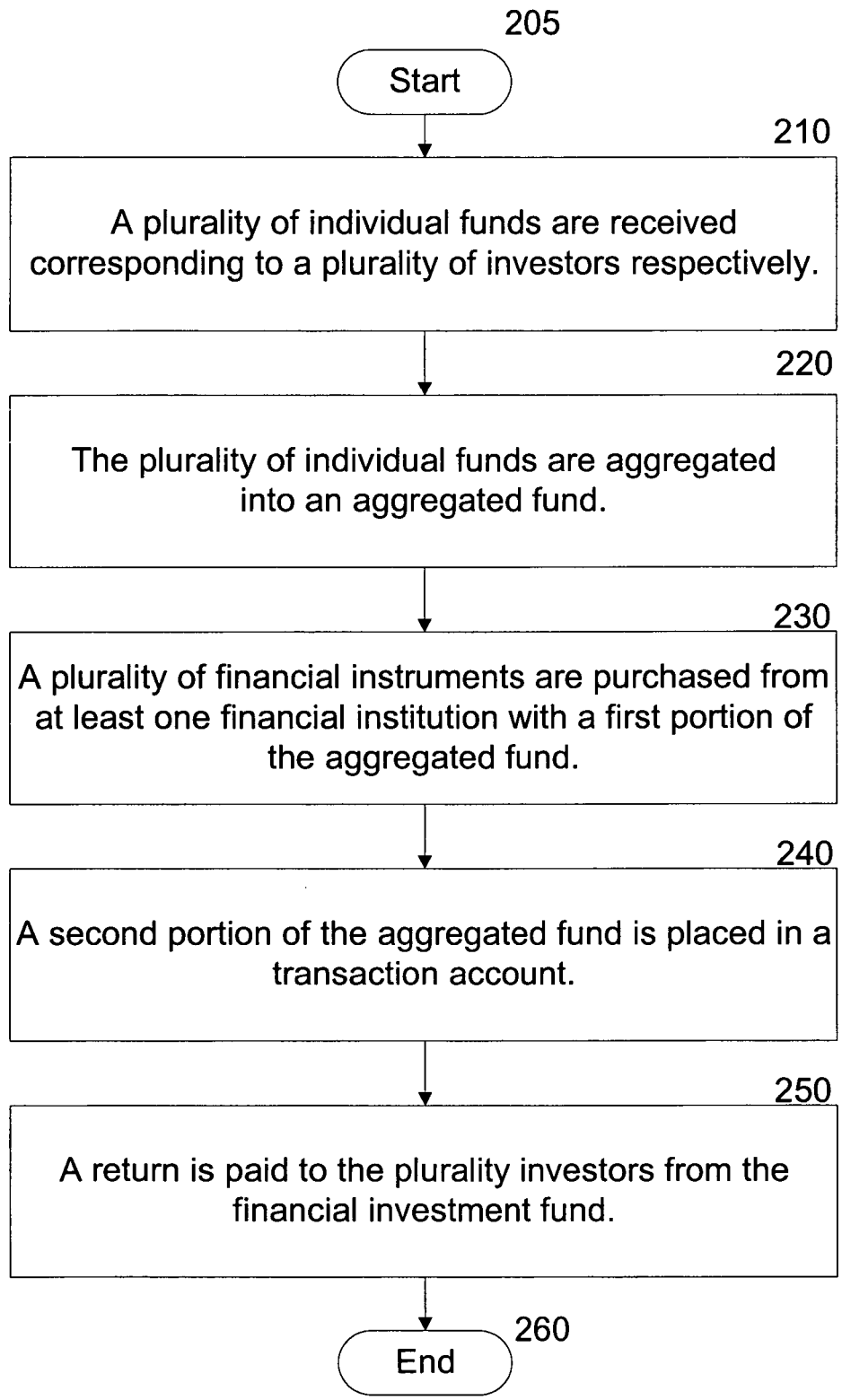
FIG. 2 is a flow chart of an exemplary method for providing a financial investment fund consistent with an embodiment of the present invention.

FIG. 2 is a flow chart setting forth the general stages involved in exemplary method 200 for providing financial investment fund 125. The implementation of the stages of exemplary method 200 in accordance with an exemplary embodiment of the present invention will be described in greater detail below. Exemplary method 200 begins at starting block 205 and proceeds to stage 210 where a plurality of individual funds are received corresponding to investors 105 respectively. For example, the funds may be received from investors 105 through a company sponsored 401(k) program 110 (or similar programs), an IRA 115, or a retail account 120. Furthermore, investors 105 are not limited, for example, to a group comprising employees, contractors, or agents of an enterprise managing financial investment fund 125. Rather, investors 105 may comprise any individual, group of individuals, or enterprise seeking to invest funds.

From stage 210 where a plurality of individual funds are received corresponding to investors 105 respectively, exemplary method 200 continues to stage 220 where the plurality of individual funds are aggregated into an aggregated fund. For example, the enterprise managing financial investment fund 125 may comprise a legal trust. This trust may receive and aggregate the funds and may provide each investor within investors 105 with documentation indicating each investor's portion of ownership in the aggregated fund.

Once the plurality of individual funds are aggregated into the aggregated fund in stage 220, exemplary method 200 advances to stage 230, where financial instruments 130 are purchased from at least one financial institution 140 with a first portion of the aggregated fund. For example, financial instruments 130 may have varying return rates or varying maturity dates as compared to one another and may comprise, for example, certificates of deposit (CDs), jumbo certificates of deposit, promissory notes, time deposits, or bonds. Specially, for example, financial instruments 130 may comprise "laddered" CDs, which means the CDs have different maturing dates. The degree of laddering may be a function of the anticipated need for liquidity within the aggregated fund. For example, the aggregated fund may be more highly laddered if more liquidity is anticipated and less laddered if a lower degree of liquidity is anticipated.

Furthermore, financial institution 140 may use a portion of the first portion of the aggregated fund received in exchange for selling financial instruments 130 to perform a function of the financial institution. For example, this function may include running a credit card operation. Generally, a credit card provider pays a merchant for goods or services when the goods or services are provided to the credit card user. The credit card user, however, does not pay the credit card provider for some time after the goods or services are provided. Therefore, financial institution 140 may use funds received in exchange for selling financial instruments 130 to pay merchants associated with financial institution's 140 credit card operation until funds are received from the credit card user. This function may be especially advantageous because a financial institution offering credit cards may be especially in need of cash (deposits) to pay merchants and, therefore, may be more willing to pay attractive rates of return on financial instruments 130 it sells or issues. Also, because credit cards typically have higher interest rates, the interest the financial institution earns may allow the financial institution to pay more attractive rates of return on the financial instruments it sells or issues. In addition, if financial institution 140 operates little or no branch banking outlets, the need for cash may be even more acute because it may not have a steady stream of deposits generated by the branch banking outlets.

Moreover, at least a portion of the plurality of individual funds may be insured by the United States federal government through the federal deposit insurance corporation (FDIC) or through the federal savings and loan insurance corporation (FSLIC). For example, the insurance coverage for retirement and other employee benefit plan accounts may be based upon the capital level of the insured bank or thrift where the deposits are made. Deposits in retirement and employee benefit plans (including so-called "section 457" plans, a type of deferred compensation plan account for employees of state and local governments and non-profit organizations) are generally insured up to $100,000 per participant's "non-contingent" interest in the plan, if the FDIC "disclosure rules" are satisfied. In effect, the insurance "passes through" to each participant who has an interest in the plan deposits. "Non-contingent" account and the "disclosure rules" are explained in more detail below.

In one example, in order to provide "pass-through" coverage, the insured institution must be able to accept "brokered deposits" under section 29 of the Federal Deposit Insurance Act. In order to accept brokered deposits, the institution must meet certain capital requirements at the time the employee benefit plan deposits are accepted. An institution may only accept brokered deposits if the institution is "well-capitalized" or if it is "adequately capitalized" and has obtained a waiver from the FDIC to accept brokered deposits.

In addition, if an institution is adequately capitalized, but does not have a waiver to accept brokered deposits, and the depositor obtains a written notice from the institution at the time that a deposit is made into an employee benefit plan, then "pass-through" insurance coverage can be provided for that deposit. In that situation, an employee benefit plan deposit would be entitled to per-participant insurance coverage.

Assuming that an employee benefit plan account is entitled to "pass-through" coverage, any interests of the same participant in any other employee benefit plan established by the same employer or employee organization, for example, a union, and deposited in the same institution is aggregated for insurance purposes. In addition, an employee's interests that is not capable of determination will be insured up to a maximum of $100,000. This insurance coverage applies, for example, to funds deposited by many health and welfare plans.

As referenced above, the current disclosure rules include that: i) the deposit account records of the depository institution must expressly disclose that the funds are those of an employee benefit plan; and ii) the account holder must maintain records that disclose the identities and interests of plan participants. The term "non-contingent interest" means an interest capable of determination without evaluation of contingencies except for those covered by the present worth tables and the calculation methods published by the IRS.

For insurance purposes, it does not matter whether the funds are derived from employee contributions made on a before-tax or after-tax basis, employer contributions, or roll-over contributions. In addition, the participants in a plan are considered to be fully vested when interests in a plan are being calculated.

According to some disclosure rules, institutions must disclose certain capital information to existing and prospective employee benefit plan administrators/depositors. The disclosures do not alter the existing deposit insurance coverage. Rather, the disclosures are designed to reduce depositor uncertainty about whether a plan's deposits are eligible for pass-through coverage, and alert benefit plan depositors when pass-through coverage is no longer available.

The depositor of an existing employee benefit plan account may request a written statement from an insured institution indicating: i) the institution's Prompt Corrective Action (PCA) category; ii) various capital ratios; and iii) a statement of whether, in the institution's judgment, the employee benefit plan account deposits qualify for pass-through insurance coverage. Similarly, when an employee benefit plan account that may be eligible for pass-through insurance coverage is opened, the insured institution must provide: i) written disclosure of the institution's PCA category; ii) various capital ratios; and iii) a statement of whether, in the institution's judgment, the employee benefit plan account deposits would qualify for pass-through insurance coverage.

Furthermore, according to some disclosures rules, within ten business days of when new, renewed, or rolled-over employee benefit plan deposits are no longer eligible for pass-through insurance due to a change in the institution's PCA rating, the institution must send a written statement to all affected depositors indicating the new PCA rating, including a notice that any new, renewed, or rolled-over employee benefit plan accounts will not qualify for pass-through insurance. Accounts that qualified for pass-through insurance when they were opened continue to be eligible until they mature. Insurance coverage on funds added to these accounts, however, will be based on the PCA rating of the institution on the date of the additional deposit. PCA ratings can only change once a quarter.

After a plurality of financial instruments 130 are purchased from at least one financial institution with a first portion of the aggregated fund in stage 230, exemplary method 200 proceeds to stage 240 where a second portion of the aggregated fund is placed in a transaction account 135. For example, unlike holding a typical CD (which may be redeemed at only a predetermined time), embodiments of the present invention allow the investors to withdraw from financial investment fund 125 at any time regardless of maturity dates of any of the individual financial instruments (including CDs) held in fund 125. To this end, transaction account 135 may be used to fund withdrawals by investors from financial investment fund 125. Because the yield received by the fund manager on financial instruments 130 is greater than the yield received on funds in transaction account 135, financial investment fund 125 may be managed to maximize funds held in financial instruments 130 and to minimize funds held in transaction account 135.

Moreover, if there are no funds in the transaction account due to, for example, investor withdraws, individual financial instruments (including CDs) held in fund 125 may be broken. In this example, if CDs are held in fund 125, CDs within the fund may be broken in order to cover investor withdraws. Any cost including penalties in breaking a CD or other financial instrument may be passed on to the investor who's withdraw created the need to break the CD or other financial instrument. Alternatively, any costs including penalties in breaking a CD or other financial instrument may be passed on to all investors in the fund.

For example, the amount in transaction account 135 may be established to cover no more than an expected amount of withdrawals from financial investment fund 125 by investors 105 over a given amount of time. The amount held in transaction account 135 may depend upon the investment needs and goals of investors 105. If investors are investing for retirement, for example, from 401 (k) account 110 or IRA account 115, withdrawals may be minimal, thus transaction account 135 may reflect a minimum amount. If investors are investing for more dynamic reasons, for example, from retail account 120, withdrawals may not be minimal, thus transaction account 135 may need to reflect a greater amount. If investors are investing for a long term, transaction account 135 may contain a lower percentage (e.g., 10%) of the total value of financial investment fund 125.

From stage 240 where a second portion of the aggregated fund is placed in a transaction account 135, exemplary method 200 continues to stage 250 where a return is paid to the plurality investors from the financial investment fund 125. For example, this return may be paid directly to investors 105 or may be reinvested into financial investment fund 125. Once a return is paid to the plurality investors from the financial investment fund in stage 250, exemplary method 200 ends at stage 260.

Consistent with an embodiment of the present invention, a system for providing a financial investment fund may comprise a component for receiving a plurality of individual funds corresponding to a plurality of investors respectively, a component for aggregating the plurality of individual funds into an aggregated fund, a component for purchasing a plurality of financial instruments from at least one financial institution with a first portion of the aggregated fund, and a component for placing a second portion of the aggregated fund in a transaction account. Furthermore, the system may comprise a component for paying a return to the plurality investors from the financial investment fund.

Figure 3:
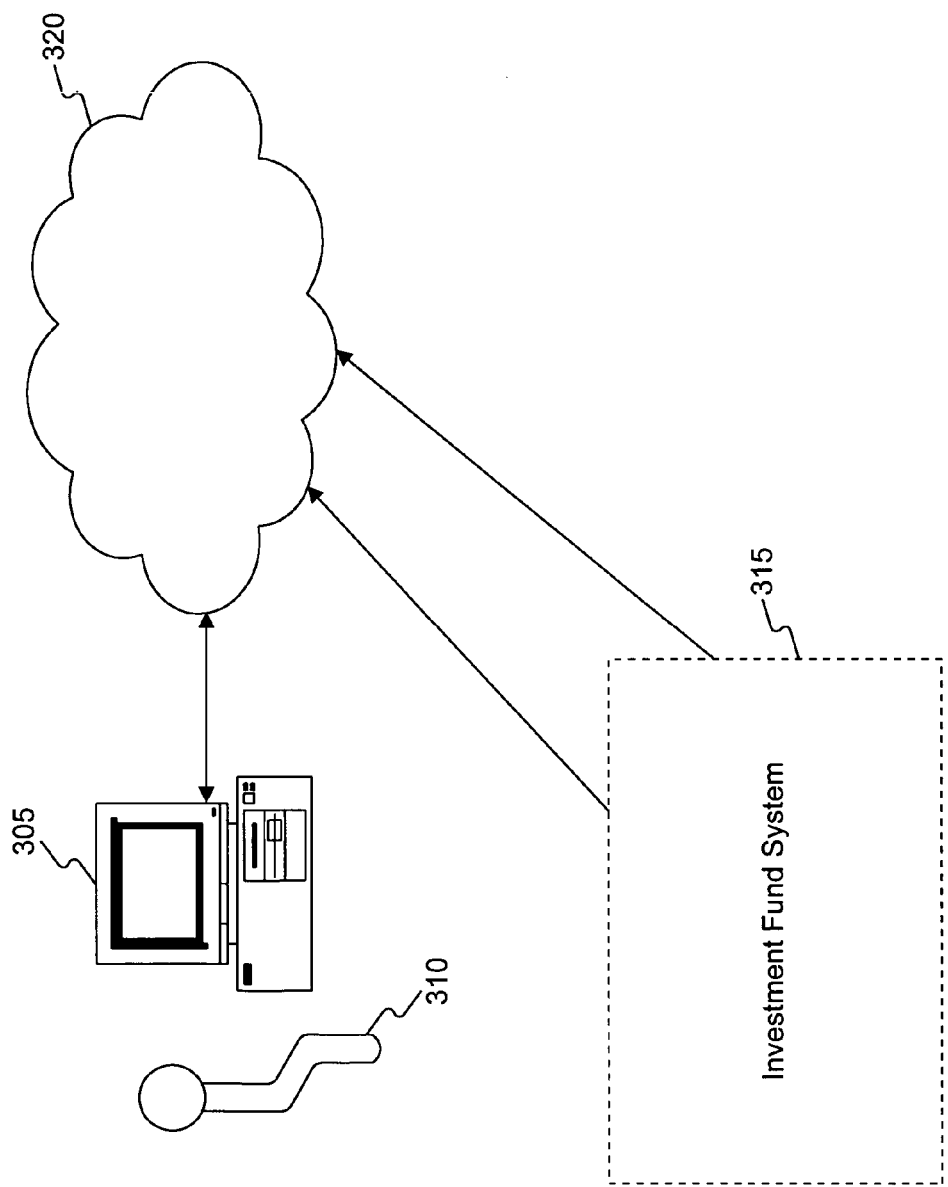
FIG. 3 is a functional block diagram of an exemplary investment system including an exemplary financial investment fund system consistent with an embodiment of the present invention.
Figure 4:
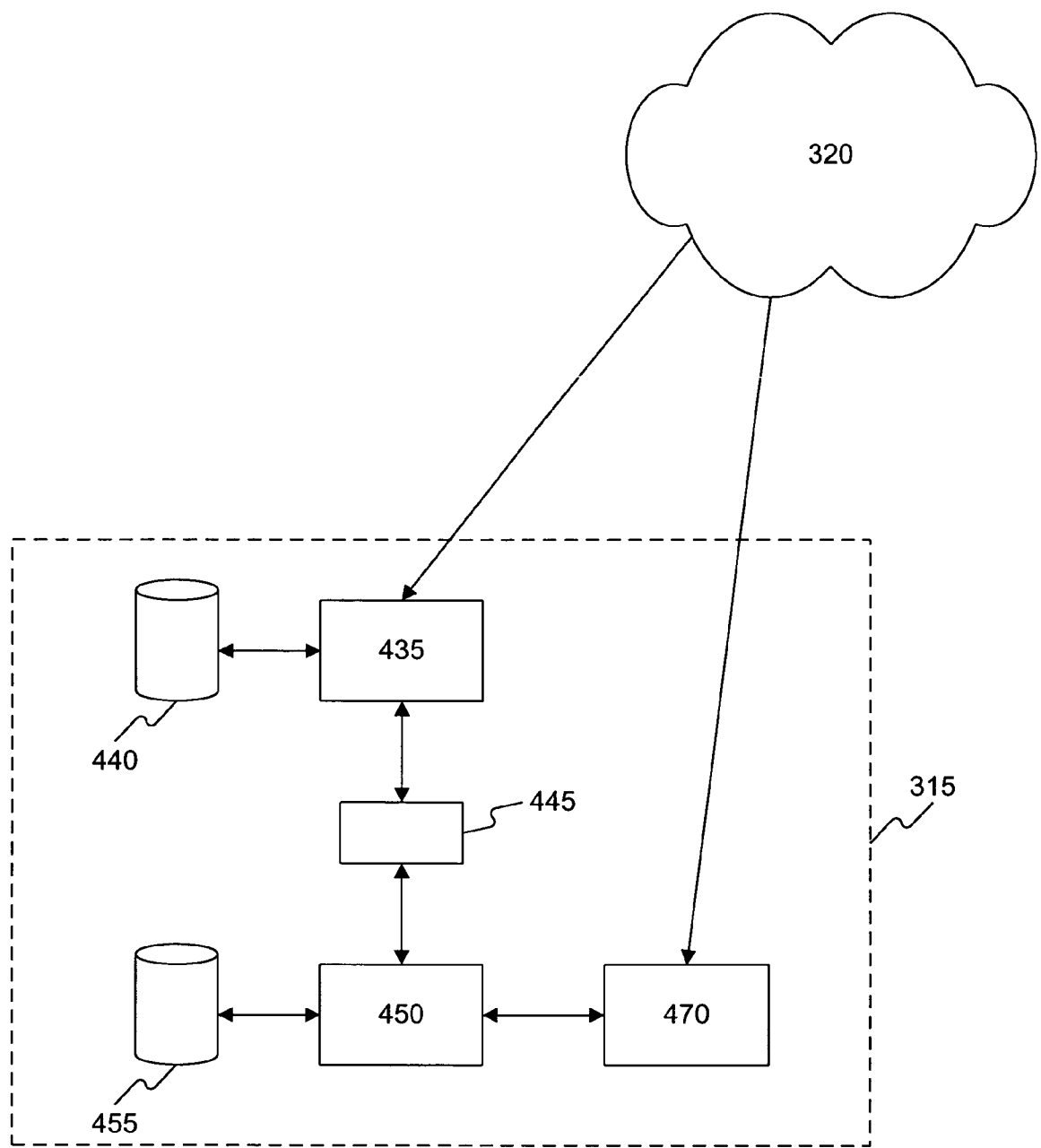
FIG. 4 is a functional block diagram of the exemplary financial investment fund system of FIG. 3 consistent with an embodiment of the present invention.

Consistent with an exemplary embodiment of the present invention, the aforementioned components described above with respect to FIGS. 1 and 2 may comprise, be disposed, or implemented within a financial investment fund system 315 as shown in FIGS. 3 and 4 and described below. Financial investment fund system 315 is exemplary and other devices and systems may comprise the aforementioned components and still be consistent with embodiments of the present invention. In addition, financial investment fund system 315 may be operated by financial institution 140, the enterprise managing financial investment fund 125, or other entities or enterprises, for example.

As herein embodied and illustrated in FIG. 3, elements of an exemplary investment system 300 comprising a user device 305, financial investment fund system 315, and a communication system 320 will be described in greater detail. FIG. 4 illustrates investment fund system 315 in greater detail. With respect to FIG. 3, user device 305 may comprise a personal computer or other similar microcomputer-based workstation. Persons of ordinary skill in the art will appreciate, however, that user device 305 may comprise any type of computer operating environment such as hand-held devices, multiprocessor systems, microprocessor-based or programmable sender electronics, minicomputers, mainframe computers, and the like. User device 305 may also be practiced in distributed computing environments where tasks are performed by remote processing devices. Furthermore, user device 305 may comprise a mobile terminal such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and user device 305 may comprise other systems or devices.

A PDA is a handheld computer that serves as an organizer for personal information. It generally includes at least a name and address database, a to-do list, and a note taker. PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

WAP is a standard for providing cellular phones, pagers and other handheld devices with secure access to e-mail and text-based Web pages. It provides a complete environment for wireless applications that includes a wireless counterpart of TCP/IP and a framework for telephony integration such as call control and phone book access. Wireless Markup Language (WML), which is a streamlined version of HTML for small screen displays, is featured in WAP. WAP uses WMLScript, a compact language that runs in limited memory, and supports handheld input methods such as keypads and voice recognition. In addition, WAP is independent of the air interface and runs over all the major wireless networks. Moreover, it is also device independent, requiring only a minimum functionality in the unit so that it can be used with many different phones and handheld devices.

User device 305 may be located in a home, an office, a store, a retail center kiosk, an office of a financial institution, an office of an enterprise managing the financial investment fund, or any location wherein it may be operated. Moreover, user device 305 may be operated by user 310 that may comprise a subject, an investor, a technician, a financial advisor, a sales consultant, a sales person, or any other person. It can be appreciated that user device 305 may be located at a variety of places and operated by a variety of people.

Communication system 320 may comprise, for example, a local area network (LAN) or a wide area network (WAN). Such networking environments are commonplace in offices, enterprise-wide computer networks, intranets, and the Internet, for example. When a LAN is used as communication system 320, user device 305 and elements of financial investment fund system 315 may be connected to communication system 320 through a network interface located at each of the respective user device 305 and elements of financial investment fund system 315. When a WAN networking environment is utilized as communication system 320, user device 305 and elements of financial investment fund system 315 typically include an internal or external modem (not shown) or other means for establishing communications over the WAN, such as the Internet.

In addition to utilizing a wire line communications system as communication system 320, a wireless communications system, or a combination of wire line and wireless may be utilized as communication system 320 in order to, for example, exchange web pages via the internet, exchange e-mails via the Internet, or for utilizing other communications channels. Wireless can be defined as radio transmission via the airwaves, however, those skilled in the art will appreciate that various other communication techniques can be used to provide wireless transmission including infrared line of sight, cellular, microwave, satellite, packet radio and spread spectrum radio. User device 305 and elements of financial investment fund system 315 in the wireless environment can be any mobile terminal such as a cellular phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding or including voice transmission.

In utilizing communication system 320, data sent over communication system 320 may be encrypted to insure data security. When encrypting, the data may be converted into a secret code for transmission over a public network. The original file, or "plaintext," may be converted into a coded equivalent called "ciphertext" via an encryption algorithm executed, for example, on user device 305 or on elements of financial investment fund system 315. The ciphertext is decoded (decrypted) at a receiving end and turned back into plaintext.

The encryption algorithm may use a key, which may be a binary number that is typically from 40 to 128 bits in length. The greater the number of bits in the key (cipher strength), the more possible key combinations and the longer it would take to break the code. The data is encrypted, or "locked," by combining the bits in the key mathematically with the data bits. At the receiving end, the key is used to "unlock" the code and restore the original data.

There are several cryptographic methods well known to those of ordinary skill in the art that may be suitable for use with system 300. For example, system 300 may use the Data Encryption Standard (DES), which uses a secret-key. In DES, both sender and receiver use the same key to encrypt and decrypt. This is a faster method, but transmitting the secret key to the recipient in the first place is not secure. Another method is public-key cryptography, such as the Rivest-Shamir-Adleman (RSA) highly-secure cryptography method by RSA Data Security, Inc., Redwood City, Calif., (www.rsa.com). RSA uses a two-part concept with both a private and a public key. The private key is kept by the owner; the public key is published. Each recipient has a private key that is kept secret and a public key that is published for everyone. The sender looks up the recipient's public key and uses it to encrypt the message. The recipient uses the private key to decrypt the message. Owners never have a need to transmit their private keys to anyone in order to have their messages decrypted, thus the private keys are not in transit and are not vulnerable.

Public key cryptography software marketed under the name Pretty Good Privacy (PGP) from Pretty Good Privacy, Inc., (PGP) of San Mateo, Calif., (www.pgp.com) may also be utilized with system 300. PGP is based on the RSA cryptographic method. A version for personal, non-business use is available on various Internet hosts. While PGP may be used to encrypt data transmitted over communication system 320, it can be appreciated that many other types of encryption algorithms, methods and schemes may be employed.

In system 300, data may be transmitted by methods and processes other than, or in combination with communication system 320. These methods and processes may include, but are not limited to, transferring data via, diskette, CD ROM; facsimile, conventional mail, an interactive voice response system (IVR), or via voice over a publicly switched telephone network. An IVR is an automated telephone answering system that responds with a voice menu and allows the user to make choices and enter information via the telephone keypad. IVR systems are widely used in call centers as well as a replacement for human switchboard operators. An IVR system may also integrate database access and fax response.

FIG. 4 illustrates a block diagram of an exemplary embodiment of financial investment fund system 315. Referring to FIG. 4, exemplary financial investment fund system 315 may comprise a first server front end 435 with its associated first server front end database 440, a first server back end 450 with its associated first server back end database 455, and a simple mail transfer protocol (SMTP) server 470. This particular architecture of financial investment fund system 315 is exemplary, and many other types of systems or architectures may be employed to implement financial investment fund system 315.

In exemplary financial investment fund system 315, first server front end 435 is separated from first server back end 450 by a first server firewall 445. One function of first server front end 435 is to provide an interface via communication system 320 between user device 305 and financial investment fund system 315. The function of the SMTP server 470 is to provide, for example, an e-mail interface via communication system 320 between user device 305 and financial investment fund system 315.

Simple mail transfer protocol is a standard e-mail protocol on the Internet. It is a TCP/IP protocol that defines the message format and the message transfer agent (MTA), which stores and forwards the mail. SMTP was originally designed for only ASCII text, but MIME and other encoding methods enable program and multimedia files to be attached to e-mail messages. SMTP servers route SMTP messages throughout the Internet to a mail server, such as a Post Office Protocol 3 (POP3) or an Internet Messaging Access Protocol (IMAP) server, which provides a message store for incoming mail.

Post Office Protocol 3 (POP3) servers, using the SMTP messaging protocol, are standard mail servers commonly used on the Internet. POP3 servers may provide a message store that holds incoming e-mail until users log on and download them. With POP3, all pending messages and attachments may be downloaded at the same time. Internet Messaging Access Protocol (IMAP) is also a standard mail server that is widely used on the Internet. It may provide a message store that holds incoming e-mail until users log on and download them. IMAP, however, may be considered more sophisticated than the POP3 mail server. In IMAP, messages can be archived in folders, mailboxes can be shared, and a user can access multiple mail servers. IMAP also integrates with MIME, which is used to attach files. For example, users can read only the headers in the message without having to automatically accept and wait for unwanted attached files to download.

First server front end 435 and first server back end 450 may comprise a personal computer or other similar microcomputer-based workstations. First server front end 435 and first server back end 450 may comprise any type of computer operating environment such as hand-held devices, multiprocessor systems, microprocessor-based or programmable sender electronics, minicomputers, mainframe computers, and the like. First server front end 435 and first Server back end 450 may also be practiced in distributed computing environments where tasks are performed by remote processing devices. Exemplary embodiments of first server front end 435 may utilize a COMPAQ PROLIANT 1600 server running WINDOWS 2000 and DOMINO Webserver. Similarly, first server back end 450 may be implemented on a COMPAQ PROLIANT 1600 server running NT4 and DOMINO Application Server. And SMTP server 470 may be implemented on a COMPAQ DL 360 running WINDOWS 2000 and DOMINO SMTP Mail Server.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator-using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, performed by a processor associated with a financial institution, for funding the financial institution through a financial investment fund, the method comprising:
receiving, by the processor, fund data reflecting a plurality of individual funds corresponding to a plurality of investors;
aggregating, by the processor, the fund data into aggregated fund data reflecting an aggregated fund for investing in the financial investment fund;
determining, by the processor, a first portion of the financial investment fund to invest in a plurality of certificates of deposit issued by the financial institution, wherein the plurality of certificates of deposit mature at varying maturity dates by laddering based on anticipated need for liquidity within the aggregated fund;
configuring, by the processor, the first portion of the financial investment fund for payment of an anticipated need for liquidity by liquidating one or more of the plurality of certificates of deposit at respective maturity dates;
determining, by the processor, an expected amount of nonanticipative withdrawals from the financial investment fund over a given amount of time based on investment needs and goals of the plurality of investors, the expected amount being set larger when the investment needs and goals are short term;
determining, by the processor, based on the expected amount of nonanticipative withdrawals, a second portion of the financial investment fund for investing in a transaction account; and
configuring, by the processor, the second portion of the financial investment fund to fund a nonanticipative withdrawal of an individual fund among the plurality of individual funds from the financial investment fund by a corresponding investor among the plurality of investors at any time regardless of maturity dates of any of the plurality of certificates of deposit in the first portion of the financial investment fund.

2. The method of claim 1, wherein the second portion of the financial investment fund is used when an investor requests liquidation of funds invested in at least one certificate of deposit at a time before the certificate of deposit matures.

3. The method of claim 1, further comprising determining, by the processor, a return to pay the plurality of investors from the financial investment fund.

4. The method of claim 1, wherein the plurality of certificates of deposit include at least one of jumbo certificates of deposit, promissory notes, time deposits, or bonds.

5. The method of claim 1, wherein the function of the financial institution comprises a credit card operation.

6. The method of claim 5, further comprising providing the first portion of the financial investment fund to pay merchants for goods or services provided to users of credit cards provided by the financial institution.

7. The method of claim 1, wherein at least a portion of the plurality of individual funds is insured by the United States federal government.

8. The method of claim 1, wherein determining the second portion of the financial investment fund further includes limiting the second portion to an amount no more than the expected amount of the nonanticipative withdrawals from the financial investment fund over the given amount of time.

9. The method of claim 1, wherein the plurality of certificates of deposit are associated with a greater yield than the transaction account.

10. The method of claim 1, wherein the financial investment fund is used in conjunction with at least one of an individual retirement account or a 401k account.

11. The method of claim 1, further comprising providing, by the processor, access to information associated with the financial investment fund via a network.

12. The method of claim 11, wherein the network is connected to a user device in a home, an office, a store, a retail center kiosk, an office of the financial institution, or an office of an enterprise managing the financial investment fund.

13. A system, including a processor associated with a financial institution, for funding the financial institution through a financial investment fund, the system comprising:
a receiving component that receives fund data reflecting a plurality of individual funds corresponding to a plurality of investors;
an aggregating component that aggregates the fund data into aggregated fund data reflecting an aggregated fund for investing into the financial investment fund;
a first determining component that determines a first portion of the financial investment fund to invest in a plurality of certificates of deposit issued by the financial institution, wherein the plurality of certificates of deposit mature at varying maturity dates by laddering based on anticipated need for liquidity within the aggregated fund;
a first configuring component that configures the first portion of the financial investment fund for payment of an anticipated need for liquidity by liquidating one or more of the plurality of certificates of deposit at respective maturity dates;
a withdrawal determining component that determines an expected amount of nonanticipative withdrawals from the financial investment fund over a given amount of time based on investment needs and goals of the plurality of investors, the expected amount being set larger when the investment needs and goals are short term;
a second determining component that determines, based on the expected amount of nonanticipative withdrawals, a second portion of the financial investment fund for investing in a transaction account; and
a second configuring component that configures the second portion of the financial investment fund to fund a nonanticipative withdrawal of an individual fund among the plurality of individual funds from the financial investment fund by a corresponding investor among the plurality of investors at any time regardless of maturity dates of any of the plurality of certificates of deposit in the first portion of the financial investment fund.

14. The system of claim 13, wherein the second portion of the financial investment fund is used when an investor requests liquidation of funds invested in at least one certificate of deposit at a time before the certificate of deposit matures.

15. The system of claim 12, further comprising a third determining component that determines a return to pay the plurality of investors from the financial investment fund.

16. The system of claim 13, wherein the plurality of certificates of deposit include at least one of jumbo certificates of deposit, promissory notes, time deposits, or bonds.

17. The system of claim 13, wherein the function of the financial institution comprises a credit card operation.

18. The system of claim 17, further comprising a component that provides the first portion of the financial investment fund to pay merchants for goods or services provided to users of credit cards provided by the financial institution.

19. The system of claim 13, wherein at least a portion of the plurality of individual funds is insured by the United States federal government.

20. The system of claim 13, wherein the second determining component limits the second portion of the financial investment fund to an amount no more than the expected amount of the nonanticipative withdrawals from the financial investment fund over the given amount of time.

21. The system of claim 13, wherein the plurality of certificates of deposit are associated with a greater yield than the transaction account.

22. The system of claim 13, wherein the financial investment fund is used in conjunction with at least one of an individual retirement account or a 401k account.

23. The system of claim 13, further comprising a communicating component that communicates over a network.

24. The system of claim 23, wherein the network is connected to a user device in a home, an office, a store, a retail center kiosk, an office of the financial institution, or an office of an enterprise managing the financial investment fund.

25. A computer-readable medium on which is stored a set of instructions for funding a financial institution through a financial investment fund, which when executed perform a method comprising:
receiving fund data reflecting a plurality of individual funds corresponding to a plurality of investors;
aggregating the fund data into aggregated fund data reflecting an aggregated fund for investing in the financial investment fund;
determining a first portion of the financial investment fund to invest in a plurality of certificates of deposit issued by the financial institution, wherein the plurality of certificates of deposit mature at varying maturity dates by laddering based on anticipated need for liquidity within the aggregated fund;
configuring the first portion of the financial investment fund for payment of an anticipated need for liquidity by liquidating one or more of the plurality of certificates of deposit at respective maturity dates;
determining an expected amount of nonanticipative withdrawals from the financial investment fund over a given amount of time based on investment needs and goals of the plurality of investors, the expected amount being set larger when the investment needs and goals are short term;
determining based on the expected amount of nonanticipative withdrawals, a second portion of the financial investment fund for investing in a transaction account; and
configuring the second portion of the financial investment fund to fund a nonanticipative withdrawal of an individual fund among the plurality of individual funds from the financial investment fund by a corresponding investor among the plurality of investors at any time regardless of maturity dates of any of the plurality of certificates of deposit in the first portion of the financial investment fund.

26. The computer-readable medium of claim 25, wherein the second portion of the financial investment fund is used when an investor requests liquidation of funds invested in at least one certificate of deposit at a time before the certificate of deposit matures.

27. The computer-readable medium of claim 25, the method further comprising:
determining a return to pay the plurality of investors from the financial investment fund.

28. The computer-readable medium of claim 25, wherein the plurality of certificates of deposit include at least one of jumbo certificates of deposit, promissory notes, time deposits, or bonds.

29. The computer-readable medium of claim 25, wherein the financial institution comprises a credit card operation.

30. The computer-readable medium of claim 29, wherein the method further comprising providing the first portion of the financial investment fund to pay merchants for goods or services provided to users of credit cards provided by the financial institution.

31. The computer-readable medium of claim 25, wherein at least a portion of the plurality of individual funds is insured by the United States federal government.

32. The computer-readable medium of claim 25, wherein determining the second portion of the financial investment fund further includes limiting the second portion to an amount no more than the expected amount of the nonanticipative withdrawals from the financial investment fund over the given amount of time.

33. The computer-readable medium of claim 25, wherein the plurality of certificates of deposit are associated with a greater yield than the transaction account.

34. The computer-readable medium of claim 25, wherein the financial investment fund is used in conjunction with at least one of an individual retirement account or a 401k account.

35. The computer-readable medium of claim 25, the method further comprising:
providing access to information associated with the financial investment fund over a network.

36. The computer-readable medium of claim 35, wherein the network is connected to a user device in a home, an office, a store, a retail center kiosk, an office of the financial institution, or an office of an enterprise managing the financial investment fund.

* * * * *

UNITED STATES PATENT AND TRADEMARK OFFICE
CERTIFICATE OF CORRECTION

PATENT NO.        : 8,799,120 B2                                        Page 1 of 1
APPLICATION NO.   : 10/712353
DATED             : August 5, 2014
INVENTOR(S)       : Benjamin H. Malka et al.

It is certified that error appears in the above-identified patent and that said Letters Patent is hereby corrected as shown below:

In the title pages, item (57), in the Abstract, line 2, "individual-funds" should read --individual funds--.

In the Claims

Claim 15, col. 13, line 6, "claim 12," should read --claim 13,--.

Signed and Sealed this
Seventeenth Day of March, 2015

Michelle K. Lee
*Director of the United States Patent and Trademark Office*